(12) United States Patent
Lu et al.

(10) Patent No.: US 10,805,882 B2
(45) Date of Patent: *Oct. 13, 2020

(54) SYSTEMS AND METHODS FOR BATTERY MANAGEMENT IN A NETWORK

(71) Applicant: u-blox AG, Thalwil (CH)

(72) Inventors: Xiao Lu, Royston (GB); Richard J. Camarillo, San Diego, CA (US)

(73) Assignee: u-blox AG, Thalwil (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/439,286

(22) Filed: Jun. 12, 2019

(65) Prior Publication Data

US 2019/0327676 A1 Oct. 24, 2019

Related U.S. Application Data

(63) Continuation of application No. 15/389,376, filed on Dec. 22, 2016, now Pat. No. 10,375,636.

(51) Int. Cl.
*H04W 52/02* (2009.01)
*H04W 76/10* (2018.01)

(52) U.S. Cl.
CPC ... *H04W 52/0225* (2013.01); *H04W 52/0277* (2013.01); *H04W 76/10* (2018.02); *Y02D 30/70* (2020.08)

(58) Field of Classification Search
CPC ......... H04W 52/0225; H04W 52/0258; H04W 52/0277; H04W 52/143; H04W 52/146; H04W 52/34; H04W 52/365; H04W 52/367; H04W 52/46; H04W 76/10; H01M 10/46; H04M 1/72525
See application file for complete search history.

(56) References Cited

U.S. PATENT DOCUMENTS 7,570,975 B2 * 8/2009 Oprescu-Surcobe ....................... H04W 52/0225
455/574
8,200,292 B2 6/2012 Wu
(Continued)

OTHER PUBLICATIONS

Fu et al, Database and Selection Method for Portable Power Sources, Advanced Engineering Materials 2005, 7, No. 8, 11 pages, 2005.

*Primary Examiner* — Frank Duong
(74) *Attorney, Agent, or Firm* — Westberg Law Offices

(57) ABSTRACT

The present invention provides network systems and methods for battery management. Battery management can include controlling transmissions to and from wireless devices. Thus, in an embodiment, a system for controlling transmissions in a wireless network is provided. A base station is configured for bidirectional wireless communication with each of a plurality of wireless devices. The base station is configured to receive battery characteristics from at least one of the plurality of wireless devices. The battery characteristics represent at least a battery type for the wireless device. Transmission constraints that correspond to each of a plurality of battery types are stored within a transmission constraints database. The base station is configured to obtain transmission constraints by looking up the battery type in the transmission constraints database. The base station may then be configured to transmit messages between the base station and the wireless device according to the obtained transmission constraints.

20 Claims, 4 Drawing Sheets

(56) References Cited

U.S. PATENT DOCUMENTS

| | | | |
|---|---|---|---|
| 8,644,204 B2 | 2/2014 | Tao | |
| 8,676,149 B2 | 3/2014 | Beamish | |
| 9,860,847 B2 | 1/2018 | Jaiswal | |
| 2003/0105601 A1* | 6/2003 | Kobayashi | G01R 31/3648 702/63 |
| 2006/0049805 A1* | 3/2006 | Tran | H02J 7/0047 320/149 |
| 2007/0091836 A1 | 4/2007 | Oprescu-Surcobe et al. | |
| 2007/0182576 A1 | 8/2007 | Proska | |
| 2010/0036628 A1 | 2/2010 | Plestid | |
| 2010/0323753 A1 | 12/2010 | Imamura et al. | |
| 2013/0308520 A1 | 11/2013 | Damnjanovic et al. | |
| 2014/0095656 A1 | 4/2014 | Brandal et al. | |
| 2014/0098744 A1 | 4/2014 | Yucek et al. | |
| 2017/0351317 A1* | 12/2017 | Tan | H04W 52/0296 |
| 2018/0175460 A1* | 6/2018 | Nguyen | H01M 10/48 |

* cited by examiner

| Device | | | | eNodeB |
|---|---|---|---|---|
| Battery capability mode | Battery type | Battery type indices | Traffic pattern indices | eNodeB traffic pattern |
| B1 | Small battery | B1a | $TP1_1$ | Sensor type traffic, or very little traffic, e.g. once per day, 20 bytes of data per report for the device |
| | | B1b | $TP1_2$ | Little traffic density, e.g. once per day, 50 bytes of data per report for the device |
| | | B1c | $TP1_3$ | Medium traffic density, e.g. 20 bytes of data several times per day for the device |
| | | B1n | $TP1_n$ | Additional traffic density definition |
| B2 | Primary battery | B2a | $TP2_1$ | Smart metering type traffic model, e.g. 50 bytes of data per report, once a day |
| | | B2b | $TP2_2$ | Smart metering type traffic model, e.g. 200 bytes of data per report, once a day |
| | | B2c | $TP2_3$ | Smart metering type traffic model, e.g. 50 bytes of data per report, 12 times a day |
| | | B2n | $TP2_n$ | Additional traffic density definition |
| B3 | Rechargeable | B3a | $TP3_1$ | Wearable/tracker type traffic, medium traffic density, e.g. 1000 bytes of data per day |
| | | B3b | $TP3_2$ | High traffic density, e.g. 1 Mbytes of data per day |
| | | B3c | $TP3_n$ | Additional traffic density definition |
| B4 | Solar | B4a | $TP4_1$ | High traffic density |
| | | B4n | $TP4_n$ | Additional traffic density definition |
| B5 | Main | B5a | $TP5_1$ | Unconstraint traffic, can let the device send as much as often |
| Bn | .. | $B(n)_k$ | $TP(n)_k$ | Additional traffic density definition |

FIG. 3

SYSTEMS AND METHODS FOR BATTERY MANAGEMENT IN A NETWORK

This application is a continuation of U.S. application Ser. No. 15/389,376, filed Dec. 22, 2016, the entire contents of which are hereby incorporated by reference.

BACKGROUND OF THE INVENTION

The present invention relates to the field of wireless electronic devices. More particularly, the present invention relates to systems and methods for managing battery-powered wireless electronic devices in networks.

Wireless electronic devices are becoming increasingly commonplace. For example, the Internet of Things (IoT) involves the internetworking of a wide variety of electronic devices that can collect and exchange data via wireless communications. Such devices can include, for example, data collection and reporting devices, (e.g., smart utility meters, security sensors and fitness monitors), location tracking devices (e.g., dog collars and portable equipment tracking devices), inventory management devices, home automation devices such as smart appliances (e.g., washers, dryers and refrigerators), and smart home safety and security systems (e.g., sensors, monitors, cameras and alarm systems).

In many applications, it is a requirement that such devices are battery-powered. This can be due to necessity (e.g., devices employed in locations without an available alternative power supply), for cost considerations (e.g., hardware and labor required to connect a device to an existing electrical grid can increase installation costs), for convenience (e.g., portable devices, including devices that can be carried on the person), or for safety reasons (e.g., devices used in and around water and devices exposed to potentially explosive chemicals or gasses).

Moreover, the operational feasibility of an application often depends on infrequent visits to device locations, as the cost of a "truck roll" needed to replace a battery is high. Thus, battery longevity is an important consideration.

Therefore, what is needed is improved systems and methods for managing battery-powered wireless devices.

SUMMARY OF THE INVENTION

The present invention provides systems and methods for battery management in a wireless network. Battery management can include controlling transmissions to and from the wireless devices. Thus, in accordance with an embodiment, a system for controlling transmissions in a wireless network is provided. A base station is configured for bidirectional wireless communication with each of a plurality of wireless devices. The base station is configured to receive battery characteristics from at least one of the plurality of wireless devices. The battery characteristics represent at least a battery type for the battery powering the wireless device. Transmission constraints that correspond to each of a plurality of battery types are stored within a transmission constraints database. The base station is configured to obtain transmission constraints by looking up the battery type in the transmission constraints database. The base station may then be configured to transmit messages between the base station and the wireless device according to the obtained transmission constraints. In other words, transmissions between the base station and the wireless device may be constrained by the obtained transmission constraints.

In accordance with a further embodiment, a method for controlling transmissions in a wireless network is provided. Battery characteristics are received at a base station from at least one of a plurality of wireless devices. The battery characteristics represent at least a battery type for the wireless device. The base station is configured for bidirectional wireless communication with each of the plurality of wireless devices. Transmission constraints for the at least one of the plurality of wireless devices are obtained from a transmission constraints database based on the battery type for the wireless device. The transmission constraints define constraints on transmissions between the base station and the wireless device. Messages between the base station and the at least one of the plurality of wireless devices may then be transmitted according to the obtained transmission constraints.

In accordance with a further embodiment, a system for controlling transmissions in a wireless network is provided. A distributed transmission constraints database has stored therein transmission constraints that correspond to each of a plurality of battery types. A plurality of wireless devices each has battery characteristics. The battery characteristics represent at least a battery type for the wireless device. Each wireless device is configured to store at least a portion of the distributed transmission constraints database. The wireless devices are configured to obtain transmission constraints by looking up the battery type in the distributed transmission constraints database. The wireless devices may then be configured to transmit messages according to the obtained transmission constraints.

These and other embodiments of the present invention are described herein.

BRIEF DESCRIPTION OF THE DRAWINGS

The present invention is described with respect to particular exemplary embodiments thereof and reference is accordingly made to the drawings in which:

FIG. 3 illustrates a transmission constraints database that can be used for managing battery-powered wireless devices according to an embodiment of the present invention.

DETAILED DESCRIPTION OF A PREFERRED EMBODIMENT OF THE INVENTION

Figure 1:
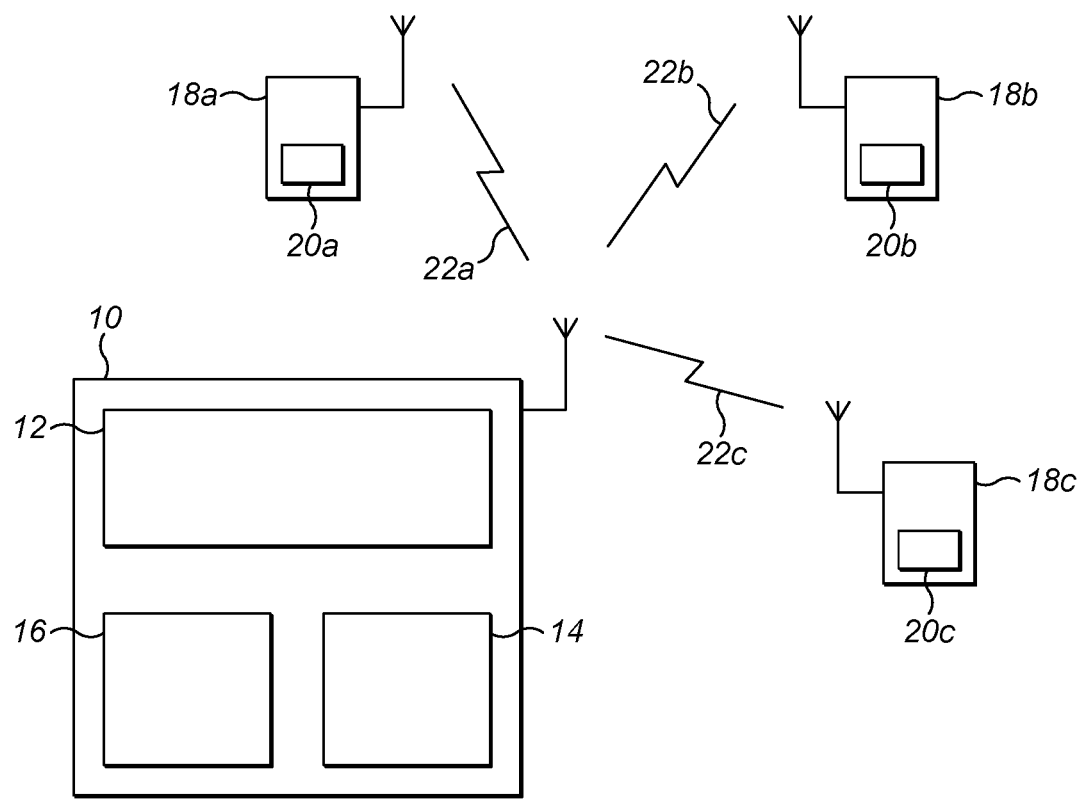
FIG. 1 illustrates a system for managing battery-powered wireless devices according to an embodiment of the present invention.

The present invention is directed towards systems and methods for managing wireless battery-powered electronic devices in a network. The battery-powered devices are configured to engage in bidirectional wireless communication with a base station. For example, the base station can be an Evolved Node B element (also referred to as "eNodeB" or "eNB") of a Long-Term Evolution (LTE) radio access network or a user equipment (UE) relay. The devices can be, for example, Internet of Things (IoT) network devices. The devices can communicate, for example, in accordance with protocols and standards applicable to 4G or 5G communication. While the present invention is described in the context of an LTE network, it will be apparent that this is not necessary and that the present invention can be employed in other types of environments.

In an embodiment of the present invention, battery types expected to be used by the wireless devices are defined in a transmission constraints database that is accessible to the base station. The database can be, for example, incorporated into the base station or located near the base station. In other embodiments, the database can be distributed with portions of the database stored at the wireless devices. Each device in the network may transmit its battery characteristics, e.g., its battery type, upon registration with the base station. For example, the battery characteristics may be represented by encoded values stored by the devices. The devices may then use those encoded values to report the battery characteristics to the base station. In this way, the wireless devices are capable of communicating their battery characteristics to the base station with minimum information and thus the power consumed by such reporting is minimized. The device may read the battery characteristics information from its local memory, on-board Subscriber Identity Module (SIM) card or similar non-volatile local storage, once it is powered up. In an embodiment, the base station decodes those values and determines the transmission constraints, e.g. a transmission pattern, for each device by looking up the received encoded value in the database. Where the database is distributed, the wireless devices themselves can look up the encoded values to determine the transmission constraints and may communicate those transmission constraints to the base station or the base station may itself look up the transmission constraints in the distributed database or in its own local database.

Once the transmission constraints for particular device are determined based on its battery characteristics, those constraints can be applied to constrain transmissions to and from the device. The base station can, for example, limit its downlink transmissions directed to the device, such as status inquiries and device polling, according to the transmission constraints. Additionally, the base station can communicate the uplink transmission constraints which the device is expected to use in its future uplink transmissions to the base station. In cellular networks, for example LTE networks, an eNodeB or UE relay can control and adjust the transmission pattern for the devices connected to it.

In many cases, IoT device power consumption is dominated by data transmission. Hence, an important aspect of battery management is to minimize the transmission frequency and transmission duration of the uplink data transmissions by the IoT devices while still providing sufficient data to meet operational requirements. Thus, in addition to battery characteristics, embodiments of the present invention can also take into account requirements for the data in determining the transmission constraints. For example, an optimal quantity of data or frequency of transmission that maximizes performance as well as a minimum data amount or frequency of transmission needed to achieve operational requirements or service agreements can be taken into account in determining the transmission constraints.

Batteries used in portable electronic devices are generally characterized by the battery manufacturer according to nominal energy storage capacity, nominal voltage, continuous current capability and operating temperature range. These values are helpful to characterize the expected energy output of the battery and can be helpful to optimize battery usage. However, the performance of the battery can be significantly altered based on its actual usage conditions and age. For example, temperature can adversely affect the battery capacity such that when discharging a particular battery at 100 mA, a temperature drop from 25° C. to −20° C. (i.e. a drop of 45 degrees Celcius) can lead to a capacity (Ah) reduction of nearly 43%. As another example, increasing current drain (or discharge rate) can result in decreasing battery capacity such that for a particular battery a 20 mA to 400 mA increase in the current drain can lead to battery capacity drop by as much as 38%. Such adverse temporal conditions can lead to a battery output voltage drop and, if the voltage drop exceeds a cut-off voltage of the battery, the wireless device may stop functioning.

Thus, if the battery is used outside of, or discharged beyond, its recommended operating conditions (e.g. temperature range, discharge current and pulse drain capability) this can degrade the battery's performance and cause the battery to be exhausted much earlier than its expected lifetime.

Accordingly, in accordance with embodiments of the present invention, capabilities and other characteristics of each battery based on different temporal conditions, such as the temperature or discharge status, are also used to determine the transmission constraints. Thus, when temporal conditions that materially affect battery performance change, these changes can be used to update the transmission constraints so as to adapt to then-current conditions. These factors can be taken into account within the transmission constraints database. In this case, the base station can determine updated transmission constraints by using the temporal conditions as additional inputs to look up transmission constraints in the database. The transmission constraints can also be updated by the base station or wireless devices by altering the existing transmission constraints (e.g., by the base station increasing periods between polling inquiries or by the wireless device increasing periods between data uplink transmissions) without having to make additional references to the transmission constraints database.

For many applications, such as utility metering or portable devices used outdoors, wireless devices need to operate in locations that occasionally experience very high or low ambient temperatures. For example, seasonal temperatures as low as −20° C. or even lower can be experienced on a nightly basis in some locations, whereas, other locations can experience high daytime temperatures as high as 35° C. or even higher. Therefore, it would be beneficial to constrain operation of such devices based on the current or anticipated environmental conditions so that the battery life is prolonged. For example, the transmission constraints for such a device can require that the device transmit its data only at times of day when the ambient temperatures are, or are anticipated to be, within a safe operating temperature range for its battery.

FIG. 1 illustrates a system for managing battery-powered wireless devices according to an embodiment of the present invention. A single base station 10 is shown, which can be, for example, an eNodeB or UE relay. It will be apparent, however, that the system can include multiple base stations. As shown in FIG. 1, the base station 10 is equipped with a processor 12 and two data storage units 14 and 16. The processor 12 controls functioning of the base station 10, in accordance with stored software programs, hardware and/or firmware. The first storage unit 14 can store software and device-related information for the network. The second storage unit 16 can store the transmission constraints database, as described herein, which includes information on different types of batteries used to power the devices in the network. The storage units 14 and 16 can be implemented by physically separated storage devices, or combined into a single physical storage or memory unit.

As further shown in FIG. 1, devices 18a, 18b, 18c, contain operational hardware 20a, 20b, 20c, respectively, which can include a local processor, data storage and a battery power supply. The base station 10 is configured to communicate with devices 18a, 18b, 18c using wireless connections 22a, 22b, 22c, respectively, to form the network.

Based on the data stored in units 14 and 16, and possibly along with other communication protocol information (e.g., standard network communication protocols), the base station 10 can define the transmission constraints for each device 18a, 18b and 18c in the network. For example, the transmission constraints database information can be stored in the storage unit 16 of the base station 10. Additionally, or alternatively, all or parts of the transmission constraints database can be distributed among the devices 22a, 22b, 22c, with portions of the database stored in local storage units of operational hardware 20a, 20b, 20c, respectively.

Among IoT devices, there are wearables, trackers, smart meters and smart agricultural devices, etc. The battery capacity requirements are very different from one use case to another. For example, small wearables (e.g. animal collars) are constrained by device size, so they are required by design to use small batteries. In these cases, the battery capacity could be around 250 mAh using coin cells or rechargeable batteries. For utilities meters, however, the battery capacity is required to be higher in order to meet a 10-15 year lifetime.

Once those devices are deployed, especially when they are switched on for the first time, base station 10 has no information regarding how the devices are to be used and what battery type capacity the devices have. If the base station 10 treats every device with the same battery capacity assumption, this could result in an unsatisfactorily short lifetime for those devices that use the relatively small batteries. Hence, embodiments of the present invention involve registering the devices with the network. This can include each device notifying the base station 10 of its battery characteristics during registration.

The registration can be done in several ways. For example, each device may report its battery characteristics to an eNodeB base station via protocol data unit (PDU) signaling, via media access control (MAC) or radio resource control (RRC) signaling or via Layer 3 network routing. In addition, a trusted authentication, e.g., stored in an embedded SIM, can be communicated from the wireless device.

Once a device is registered, the base station 10 may then obtain initial transmission constraints from the database. The mapping algorithm can be used to set initial traffic pattern constraints based on a particular battery type. For example, if the battery capability mode is set to 'B1a' to indicate for example a coin cell CR2032's capability, then the mapping algorithm fetches the stored in formation about this particular battery. This information which represents typical battery energy capacity, discharge characteristics, e.g., for B1a, 225 mAh nominal capacity, 3 mA max continuous current and 15 m mA maximum pulse capability, can be stored in the transmission constraints database.

Thus, the transmission constraints database information may simply contain a mapping of battery type to transmission constraints. However, the database may also include more detailed information on the behavior of the battery type in certain conditions, e.g., operating temperature, remaining capacity, etc. This type of information may be accessed or used, if the device sends relevant real-time information to base station 10. In order to minimize the frequency of transmissions, the reporting of such temporal conditions may only be triggered upon changes in a predefined threshold. For example, such reporting may only occur if the local temperature exceeds or falls below, predefined thresholds, or if the battery discharge conditions exceed predefined thresholds.

Optionally, temperature information about the device, e.g. the ambient temperature of the device, can be either communicated from the device to the base station 10, or stored in the base station 10 (by e.g. receiving information from a local weather report). In this way the traffic pattern of the device can also be configured as a function of the device's ambient temperature. Additionally, the mapping algorithm can also incorporate local weather conditions as an additional input.

As an illustrative example, assume that a wireless device used for utility metering registers its battery type with the base station 10 upon initial deployment and the base station 10 uses this information as input to the transmission constraints database to determine the initial transmission constraints. The initial constraints may require the device to provide a twice daily report of metering data. Meanwhile, the base station 10 may receive weather reports for the area in which the device is employed. If a weather report is received by the base station that forecasts a drop in nighttime temperatures such that they are expected to be outside the recommended operating temperature for the battery of the device, the base station 10 may use this information to as an additional input to the transmission constraints database which may result in different (i.e. updated) transmission constraints. The updated constraints may require the device to provide a single daily report of metering data at a time during the day when the ambient temperatures are expected to be within the recommended operating temperature range for the battery of the device (e.g. 4 pm daily). This can be accomplished by selecting transmission constraints that require a longer eDRX (Extended Discontinuous Reception) cycle and that permit uplink reporting to occur at 4 pm daily. As a result, the sensor stays in a sleep state most of the time and particularly when ambient temperatures are expected to be outside its recommended operating temperature range. Then, after some time, a new weather report may be received that forecasts nighttime temperature to remain within the recommended operating temperature range for the battery of the device. The base station 10 may then use this information as an additional input to the transmission constraints database which may result in updating the transmission constraints so that they return to those initially set such that the device returns once again, to twice daily report of metering data.

Thus, IoT devices having delay tolerant service requirements can avoid transmission during cold conditions and enable transmission at relatively higher temperature to minimize potential battery capacity loss due to low temperature operation. A system with this feature will be able to delay data transmission in the uplink so that it can be transmitting during preferred conditions.

In the example above, the base station 10 obtains the updated transmission constraints from the transmission constraints database. In an alternative embodiment, the base station 10 may instead update the initial transmission constraints without reference to the transmission constraints database. Assume, as in the above example, that the initial constraints require the device to provide a twice daily report of metering data and that the base station 10 receives a weather report that forecasts a drop in nighttime temperatures such that they are expected to be outside the recommended operating temperature for the battery of the device, the base station 10 may apply this information (i.e. periods of expected out-of-range temperatures) as a mask or filter to the initial transmission constraints such that the resulting updated transmission constraints do not entail any uplink transmissions that would otherwise have occurred during a period of out-of-range temperature. The effect will be the same as in the example above; that is, metering reports scheduled for nighttime are masked and the remaining metering reports will occur only once daily. Then, as in the example above, a new weather report may be received that forecasts nighttime temperature to remain within the recommended operating temperature range for the battery of the device. The base station 10 may then use this information to remove the mask or filter. The effect will be to return the transmission constraints as they were initially set so that the device, once again, returns to twice daily metering reports.

In another illustrative example, assume that a wireless device is deployed as a wearable activity monitor. For example, a smart trainer device is worn by a hiker named John to measure his heartrate. Upon registration with the base station 10, the base station 10 uses its battery type as input to the transmission constraints database to determine the initial transmission constraints. The initial constraints may require the wireless device to provide an hourly report of activity data so that an application program can use this information provide feedback and guidance to John regarding his physical activity. The device itself may be equipped with a temperature sensor. After having been deployed for some time, the device senses that current ambient temperature is outside the recommended operating temperature for the battery of the device. In this case, the wireless device may use this information to update its uplink transmission constraints. For example, the device may cease sending any uplink data and may instead continuously store the activity data locally. Thus, the applicable transmission constraints take into account that it would be preferable to delay the reporting rather than risk battery damage. The smart trainer device, therefore, delays (i.e. pauses) its reporting while continuing to store the activity data. Then, once the device senses that current ambient temperature is within the recommended operating temperature for the battery of the device (for example, John then finishes the hiking trip and returns back to his camp), the device may upload the stored activity data to the base station 10 and return to its initial transmission constraints which entail sending hourly activity data reports. Thus, the smart trainer device identifies the change in temperature and determines that it has returned to a safe operating level and, therefore, the device proceeds with reporting the activity data to the base station. Thus, for non-mission critical, delay tolerant IoT devices that send infrequent data real-time data can be used to optimally schedule transmissions to preserve battery life.

In an embodiment in which the wireless device delays or pauses its reporting, the wireless device may also notify the base station that it is doing so. This may be accomplished, for example, if in RRC CONNECTED state, after DL (downlink) reception and decoding, the wireless device may not initiate the RACH (random access channel) procedure to avoid transmission; as a result, the base station may then release the connection after a wait time has expired. Alternatively, the wireless device may transmit a request to the base station for the wireless device to enter power saving mode when the temperature is low, whilst the wireless device continues to remain registered with the network. Once the wireless device signals a temperature condition (e.g. in the order of 5° C.) to the base station, then base station may, for example, then decide the best time for the modem to transmit data according to its local weather record.

Of course, for applications that require event-driven transmissions or that require frequent data transmissions, such postponements of transmissions may not be possible. In such cases, other strategies may be employed, such a reducing frequency of transmissions, rather than pausing them altogether, or using a lower transmit power for the transmissions.

Service level requirements may also be taken into account in the initial transmission constraints. For example, if the applicable service agreement is set such that the device shall be operational for at least one year, then the mapping algorithm can apply this information to determine an optimum traffic pattern with respect to frequency of transmission, data size and transmission power. In other words, upon knowing the battery capability bits (e.g., B1a), together with some additional information (e.g., minimum operation duration), the mapping function can be used to determine an optimum traffic pattern for this particular instance.

Furthermore, if the battery status is changed, for example, battery energy capacity drops due to excessive discharge or temperature drops, the device may send an updated category bits/subcategory bits (e.g., representing a lower battery capability) to request for example a new transmission pattern with lower frequency and less data. As an example, if a device initially uses battery capability bits 'B1b' to represent a coin cell CR2450 is used (battery energy capacity 620 mA), after several months' service or excessive discharge, the device detects that the remaining available battery capacity has dropped down to 200 mAh, then the device sends an updated battery capability 'B1a' to indicate a lower battery capability (e.g., 225 mAh). This would then map to a less frequent and/or smaller data transmission size and/or lower transmission power to make the most use of the remaining battery capacity within a pre-defined timeframe.

Figure 2:
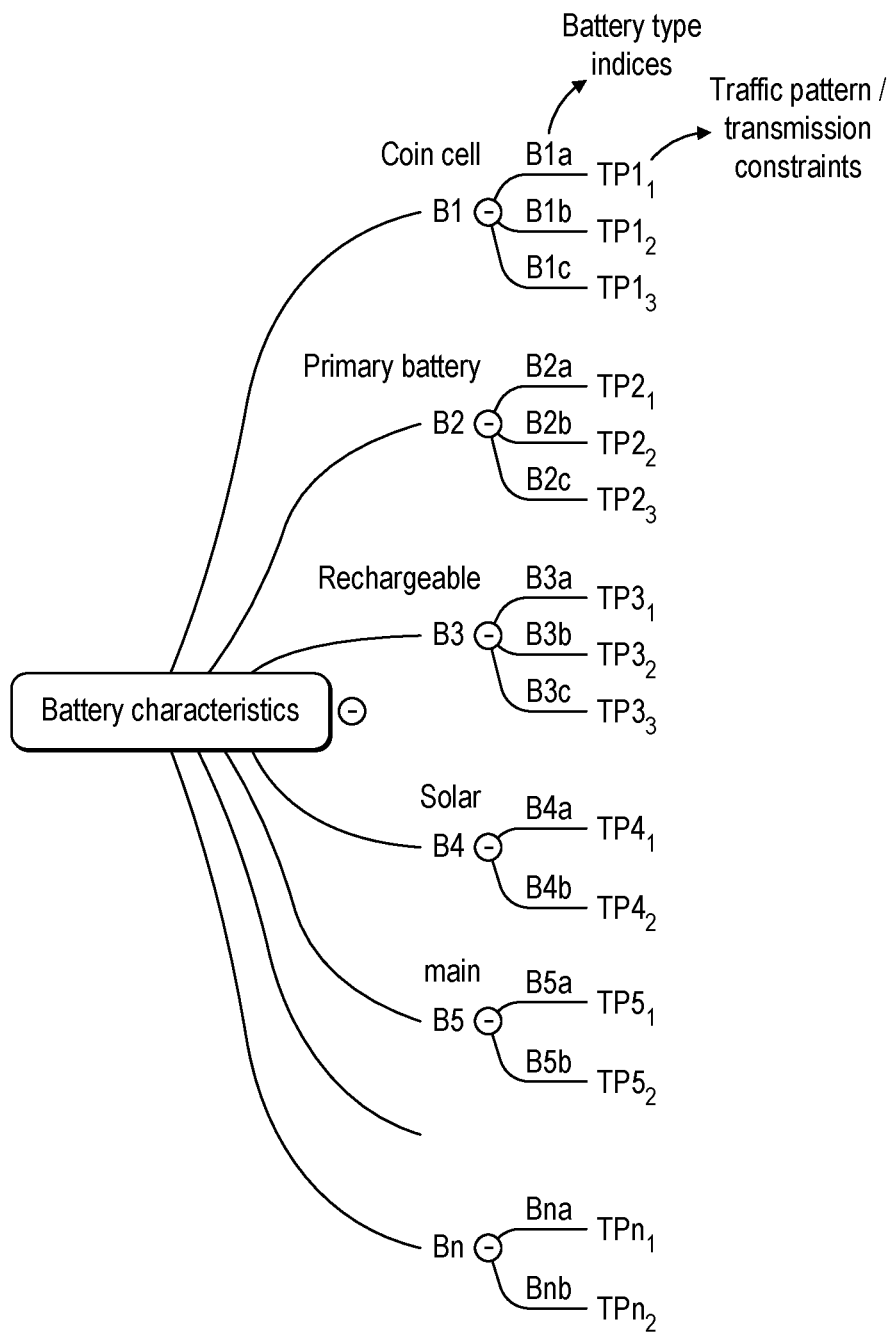
FIG. 2 illustrates mapping of battery characteristics to communication traffic constraints according to an embodiment of the present invention.

FIG. 2 illustrates an exemplary mapping of battery characteristics to communication traffic constraints according to an embodiment of the present invention. As shown in FIG. 2, mapping can incorporate a tree structure with the battery characteristics used to identify appropriate communication constraints. This can be a mapping between battery type as input and the corresponding traffic pattern as output that can be used by the eNodeB. As shown in FIG. 2, a few bits can be used to represent the different battery types (e.g. coin cell, primary, rechargeable, solar, main, etc.) as main branches of the tree, whilst under each type or branch, a few bits represent a richer subcategory or sub-branch (e.g. subcategories can represent different battery capacity, pulse capability or peak current). Within the subcategories, corresponding traffic pattern with an even richer representation of the traffic pattern can be mapped. The resulting traffic patterns can be represented by leaves of the tree structure. It will be apparent that such a structure can be adapted to accommodate any number and arrangement of main branches, sub-branches and leaves including any number of levels of branching.

An aspect of this mapping is to facilitate a mapping between battery type and traffic pattern(s). However, the mapping may also accommodate service requirements (e.g., desired or optimal data levels as well as minimum data levels needed to meet service objectives) and temporal conditions (e.g., temperature, battery discharge status, weather, etc.). The base station 10 may then use the information obtained from the mapping to optimize network resources. This allows optimization of system performance by managing device power consumption based on battery type and temporal conditions while still maintaining acceptable levels of service.

In addition to the traffic pattern information, the data stored in the database may contain information representing battery behavior in various operating conditions. This type of information can be communicated from the IoT device to the eNodeB using a few bits either in connected mode or idle mode. This may be triggered, for example, if the device detects temperature or voltage changes beyond the predefined range. Upon receiving the update from the device on the new battery capability, eNB updates the traffic pattern accordingly to improve device energy consumption.

The map can be simplified as: $TP(n)_k = f\{B(n)_k\}$ where $TP(n)_k$ represents traffic pattern information corresponding to battery type n and subcategory k, $B(n)_k$ represents battery capability corresponding to battery type n and subcategory k, and $f\{\ldots\}$ represents the mapping function/algorithm.

FIG. 3 illustrates a transmission constraints database that can be used for managing battery-powered wireless devices according to an embodiment of the present invention. This database can be, for example, stored in the storage unit 16 of base station 10 and used to implement the mapping of FIG. 2. FIG. 3 shows additional details of exemplary transmission patterns that can be assigned based on battery type and service level needs. The transmission pattern can be specified in terms of data density (e.g. quantity and frequency of data transmissions required) and transmission power. For example, a sensor requiring a "very light" data traffic density might transmit 20 bytes of data once per day. As another example, a sensor requiring only "light" traffic density might transmit 50 bytes of data once per day. Still further, a sensor requiring "medium" traffic density might transmit 20 bytes of data several times per day, and so forth, depending upon the requirements of a particular application.

Figure 4:
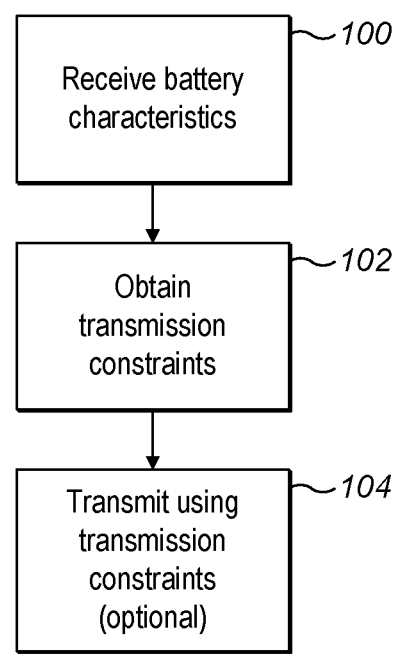
FIG. 4 illustrates a method of managing battery-powered wireless devices according to an embodiment of the present invention.

FIG. 4 illustrates a method of managing battery-powered wireless devices according to an embodiment of the present invention. In a step 100, battery characteristics from at least one of a plurality of wireless devices are received at a base station. The battery characteristics representing at least a battery type for the wireless device. The base station is configured for bidirectional wireless communication with each of the plurality of wireless devices.

In a step 102, transmission constraints for the at least one of the plurality of wireless devices are obtained. The transmission constraints are obtained from a transmission constraints database based on the battery type for the wireless device. The transmission constraints define constraints on transmissions between the base station and the wireless device.

In a step 104, which can be optionally performed, messages between the base station and the at least one of the plurality of wireless devices are transmitted according to the obtained transmission constraints.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A system for battery capability management in a wireless network comprising:
   a base station configured for bidirectional wireless communication with each of a plurality of wireless devices, wherein the base station is configured to receive battery characteristics from at least one of the plurality of wireless devices, the battery characteristics representing at least a battery capability mode for the at least one of the plurality of wireless devices, the battery capability mode indicating whether the at least one of the wireless devices is powered by a rechargeable battery; and
   a transmission constraints database having stored therein transmission constraints that correspond to each of a plurality of battery capability modes, the transmission constraints defining constraints on transmissions between the base station and the at least one of the wireless devices, wherein the base station is configured to obtain transmission constraints by looking up the battery capability mode in the transmission constraints database.

2. The system according to claim 1, wherein when the battery capability mode indicates the at least one of the wireless devices is powered other than by a rechargeable battery, the battery capability mode indicates whether the at least one of the wireless devices is powered by a coin-cell battery.

3. The system according to claim 1, wherein when the battery capability mode indicates the at least one of the wireless devices is powered other than by a rechargeable battery, the battery capability mode indicates whether the at least one of the wireless devices is powered by a primary battery.

4. The system according to claim 1, wherein the base station is configured to transmit messages between the base station and the at least one of the wireless devices using the obtained transmission constraints.

5. The system according to claim 1, wherein the base station is configured to obtain updated transmission constraints from the transmission constraints database based on the battery capability mode and one or more temporal conditions.

6. The system according to claim 5, wherein the at least one of the wireless devices is configured to modify transmitting of uplink messages in response to the one or more temporal conditions.

7. A system for battery capability management in a wireless network comprising:
   a base station configured for bidirectional wireless communication with each of a plurality of wireless devices, wherein the base station is configured to receive battery characteristics from at least one of the plurality of wireless devices, the battery characteristics representing at least a battery capability mode for the at least one of the plurality of wireless devices, the battery capability mode indicating whether the at least one of the wireless devices is powered by a primary battery; and
   a transmission constraints database having stored therein transmission constraints that correspond to each of a plurality of battery capability modes, the transmission constraints defining constraints on transmissions between the base station and the at least one of the wireless devices, wherein the base station is configured to obtain transmission constraints by looking up the battery capability mode in the transmission constraints database.

8. The system according to claim 7, wherein when the battery capability mode indicates the at least one of the wireless devices is powered other than by a primary battery, the battery capability mode indicates whether the at least one of the wireless devices is powered by a rechargeable battery.

9. The system according to claim 7, wherein when the battery capability mode indicates the at least one of the wireless devices is powered other than by a rechargeable battery, the battery capability mode indicates whether the at least one of the wireless devices is solar powered.

10. The system according to claim 7, wherein the base station is configured to transmit messages between the base station and the at least one of the wireless devices using the obtained transmission constraints.

11. The system according to claim 7, wherein the base station is configured to obtain updated transmission constraints from the transmission constraints database based on the battery capability mode and one or more temporal conditions.

12. The system according to claim 11, wherein the at least one of the wireless devices is configured to modify transmitting of uplink messages in response to the one or more temporal conditions.

13. A system for battery capability management in a wireless network comprising:
a base station configured for bidirectional wireless communication with each of a plurality of wireless devices, wherein the base station is configured to receive battery characteristics from at least one of the plurality of wireless devices, the battery characteristics representing at least a battery capability mode for the at least one of the plurality of wireless devices, the battery capability mode indicating whether the at least one of the wireless devices is powered by a particular type of battery or is main powered; and
a transmission constraints database having stored therein transmission constraints that correspond to each of a plurality of battery capability modes, the transmission constraints defining constraints on transmissions between the base station and the at least one of the wireless devices, wherein the base station is configured to obtain transmission constraints by looking up the battery capability mode in the transmission constraints database.

14. The system according to claim 13, wherein when the at least one of the wireless devices is main powered, transmissions are unconstrained in accordance with the battery capability mode.

15. The system according to claim 13, wherein when the battery capability mode indicates the at least one of the wireless devices is other than main powered, the battery capability mode indicates whether the at least one of the wireless devices is powered by a particular type of battery that is rechargeable.

16. The system according to claim 13, wherein when the battery capability mode indicates the at least one of the wireless devices is other than main powered, the battery capability mode indicates whether the at least one of the wireless devices is powered by a particular type of battery that is non-rechargeable battery.

17. The system according to claim 13, wherein the base station is configured to transmit messages between the base station and the at least one of the wireless devices using the obtained transmission constraints.

18. The system according to claim 13, wherein the base station is configured to obtain updated transmission constraints from the transmission constraints database based on the battery capability mode and one or more temporal conditions.

19. The system according to claim 18, wherein the at least one of the wireless devices is configured to modify transmitting of uplink messages in response to the one or more temporal conditions.

20. A system for battery capability management in a wireless network comprising:
a base station configured for bidirectional wireless communication with each of a plurality of wireless devices, wherein the base station is configured to receive battery characteristics from at least one of the plurality of wireless devices, the battery characteristics representing at least a battery capability mode for the at least one of the plurality of wireless devices, the battery capability mode indicating whether the at least one of the wireless devices is solar powered; and
a transmission constraints database having stored therein transmission constraints that correspond to each of a plurality of battery capability modes, the transmission constraints defining constraints on transmissions between the base station and the at least one of the wireless devices, wherein the base station is configured to obtain transmission constraints by looking up the battery capability mode in the transmission constraints database.

* * * * *